H. HOWSON.
STEP GUARD FOR PASSENGER CARS.
APPLICATION FILED OCT. 31, 1910.
1,032,832.
Patented July 16, 1912.
3 SHEETS—SHEET 1.
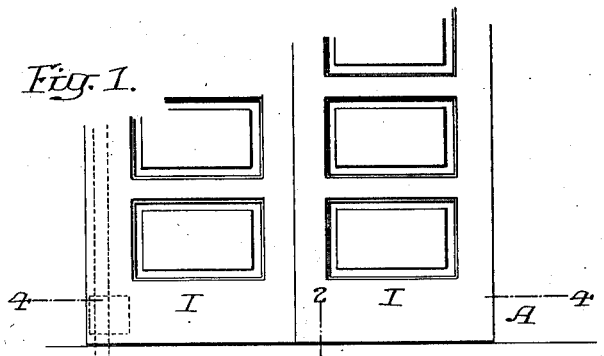
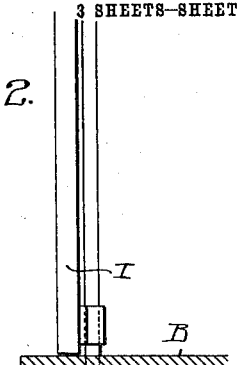
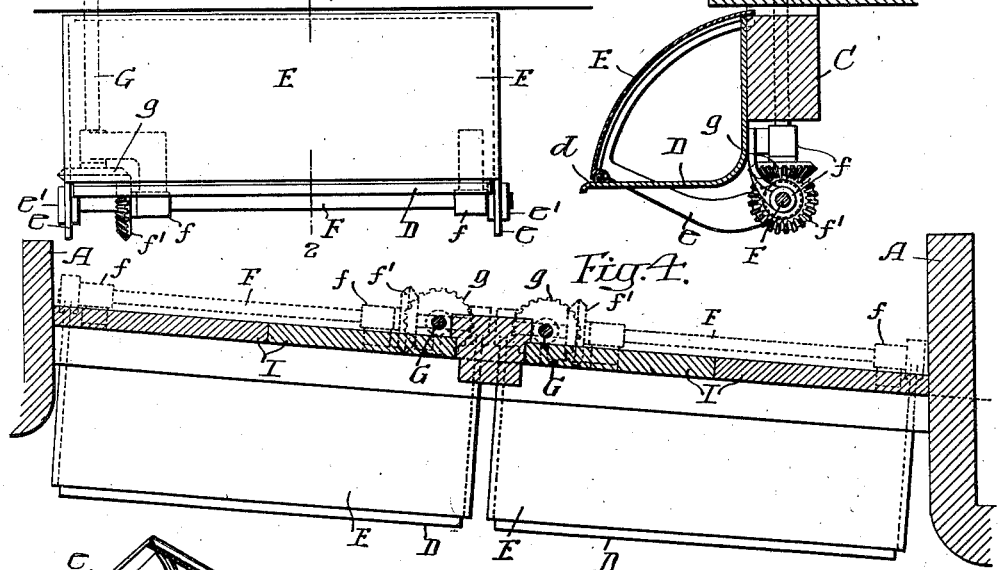
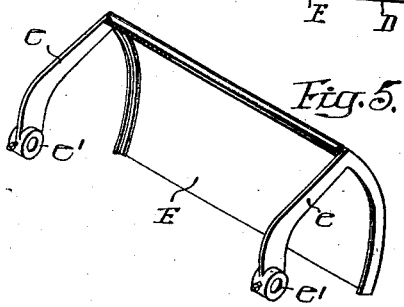
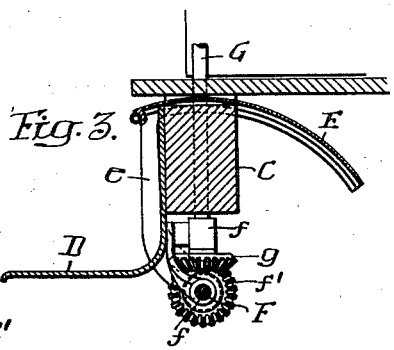
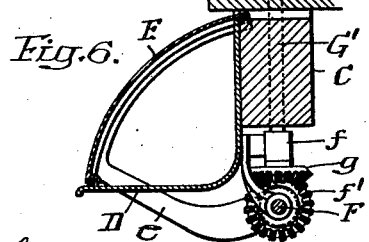

H. HOWSON.
STEP GUARD FOR PASSENGER CARS.
APPLICATION FILED OCT. 31, 1910.
1,032,832.
Patented July 16, 1912.
3 SHEETS—SHEET 2.
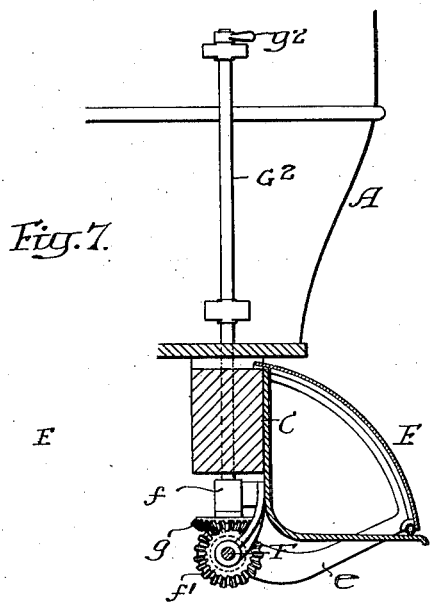
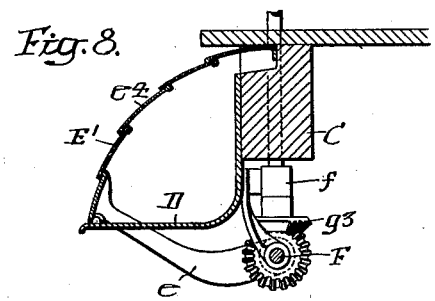
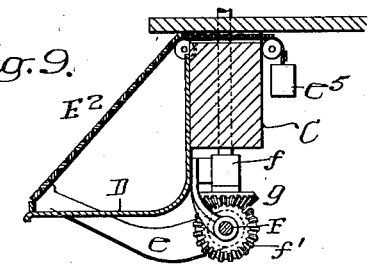
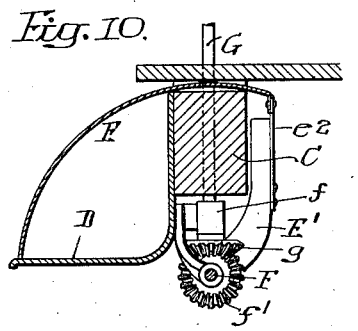
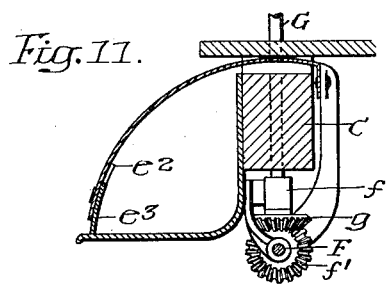
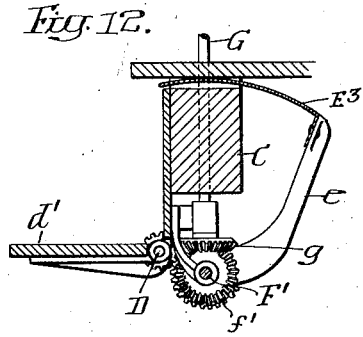
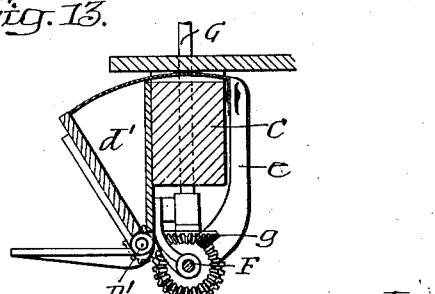
Witnesses
Inventor
Henry Howson
by his Attorneys
Howson & Howson
Henry Howson

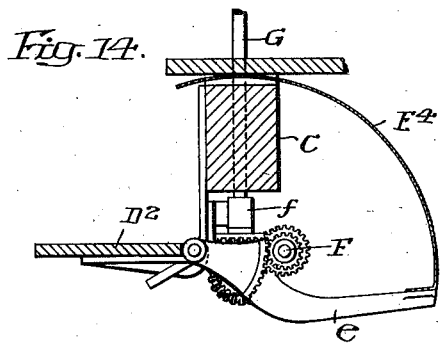
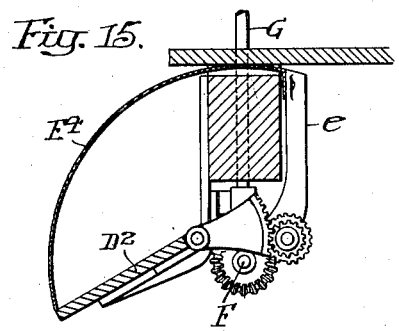
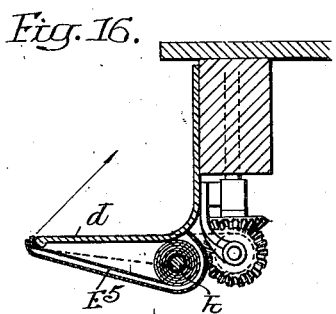
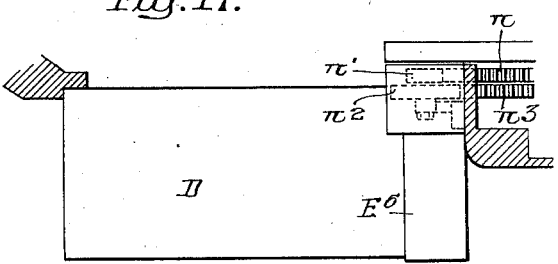
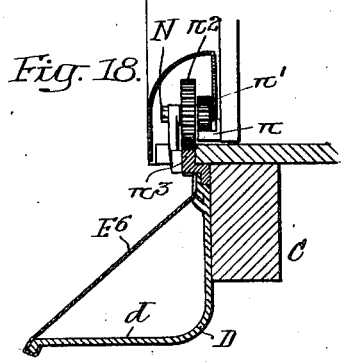
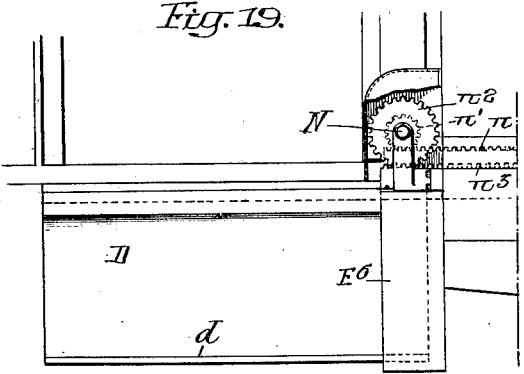

UNITED STATES PATENT OFFICE.

HENRY HOWSON, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

STEP-GUARD FOR PASSENGER-CARS.

1,032,832.  Specification of Letters Patent.  Patented July 16, 1912.

Application filed October 31, 1910. Serial No. 590,017.

*To all whom it may concern:*

Be it known that I, HENRY HOWSON, a citizen of the United States, residing in Philadelphia, Pennsylvania, have invented certain Improvements in Step-Guards for Passenger-Cars, of which the following is a specification.

My invention relates to certain improvements in passenger cars in which a fixed step is used for the ingress and egress of passengers.

The object of my invention is to provide means for covering the step when the car is in motion or when the doors, if used, are closed.

The invention is especially applicable to cars in which doors close the side of the platform.

In the following drawings:—Figure 1, is a side view of sufficient of a passenger car to illustrate my invention; Fig. 2, is a transverse sectional view on the line 2—2, Fig. 1; Fig. 3, is a view similar to Fig. 2, showing the guard raised and the door in the open position; Fig. 4, is a sectional plan view on the line 4—4, Fig. 1; showing the side of a car platform with two sets of folding doors and movable step guards; Fig. 5, is a perspective view of one of the guards;
Fig. 6, is a transverse sectional view showing my invention applied to a sliding door; Fig. 7, is a transverse sectional view illustrating the guard operated by hand mechanism independently of the doors; Figs. 8 and 9, are views of modified forms of the guard; Fig. 10, is a view showing a still further modification in which the guard is yieldingly connected to the operating mechanism; Fig. 11, is a view illustrating the guard provided with a yielding section at its edge; Figs. 12 and 13, are views of modifications in which the tread of the step is raised to meet the guard; Figs. 14 and 15, are views illustrating the movable tread of the step capable of being lowered on the movement of the guard to the closed position; Fig. 16, is a view of a guard arranged to be raised to inclose the tread of the step instead of being lowered as in Fig. 1; and Figs. 17, 18 and 19, are sectional views illustrating modifications in which the guard slides laterally to either close or expose the step.

A is the body of the car.

B is the platform made in the ordinary manner and supported by the usual beams C which project from the main framework of the car.

D is a fixed step, which may be of any type desired and may have one or two treads, if necessary, according to the height of the platform. The step can be secured to the framework in the usual manner.

Means have heretofore been provided for protecting the step by mechanism attached to doors which close the passageway to the platform or the step has been movably connected with the doors so that it will be raised when the doors are closed and lowered into position when the doors are opened. Movable steps are objectionable, as a person is liable to mount the step when it is being moved either into its closed or open position. In many instances it is desirable to have one or more swinging doors at the side of a platform or sliding doors, and in some instances it may be desirable to guard the steps at the side of a car without providing doors. I make the step guard entirely independent of gates, rails or doors at the side of the car so that by the invention the step can be covered with or without the use of doors at the side of the platform.

E is the shield or guard having, in the present instance, arms $e$ which have hubs $e'$ mounted on a shaft F adapted to bearings $f$ secured to the step or framework of the car. In Figs. 1 and 2, I have illustrated the shaft F provided with a bevel gear wheel $f'$, which meshes with a bevel wheel $g$ on a vertical shaft G extending through the platform B and forming a pintle of the door I which is hinged and so arranged as to close the side of the platform leading to the step D. The door may be one of a pair of hinged doors, or it may be a single door closing the passageway. When the door is in the closed position the guard E is down, resting over the tread portion $d$ of the step D preventing the use of the step, but when the door is moved to the open position the guard E will be raised through the medium of the gears $g$ and $f'$ so that the step tread will be exposed and can be used by passengers either in boarding or alighting from the car.

In the construction illustrated in Fig. 2, the guard E is positively connected to the shaft so that it must move with it, but in Fig. 10, I have shown a modification in which the guard E is moved by the arm E' on the shaft and between the arm and the guard is a spring $e^2$ which would yield if there were an obstruction on the step, so that if a passenger was about to mount the step and the guard was moved to the closed position it would not pinch the foot of the passenger but would yield until the foot was withdrawn when it would complete its movement. Instead of this construction, the construction shown in Fig. 11 may be used for accomplishing the same purpose and this consists of a yielding section $e^3$ located at the outer end of the guard so that if there is any obstruction the section $e^3$ will yield until the obstruction is removed, when it will automatically close against the step by its own weight or by a spring.

In Fig. 6, I have illustrated my invention operated by a sliding door I' instead of a pivoted door, as illustrated in Fig. 2. The sliding door can be actuated in any suitable manner and has a rack $i$ in the present instance which meshes with a pinion $g'$ on the shaft G', which is geared to the shaft F on which the guard E is mounted, so that on the movement of the door the guard will be moved to its open or closed position. I prefer to arrange the gearing so that the guard will not be closed until the door is moved to such a position that a person cannot pass through the opening, after which the guard can be operated. This prevents the operation of the guard when the step is being used. See broken gear $g^3$, Fig. 8.

In Fig. 7, I have illustrated the guard operated by an independent lever $g^2$ which is mounted on the shaft $G^2$ and located at any convenient point on or near the platform, so that on turning the lever the guard can be moved into or out of position. A guard of this construction may be used on a platform which is not provided with doors or gates, or may be used when it is desired to independently operate the guard and the doors.

While in Fig. 1 the guard is made of a continuous curved piece, preferably of metal, in Fig. 8 the guard E' is made of a series of segments $e^4$, one sliding past the other, each section having a projection and the lower section is connected to the shaft so that when it is raised and lowered it will move the other sections. In this construction there would be no space between one of the side sills C and the floor of the platform B, as the parts will telescope directly under the edge of the platform.

In Fig. 9, I have shown another modification in which a flexible guard $E^2$ is used, made up of either steel strips or wooden strips backed with canvas. The forward end of the guard in this instance is connected to arms $e$ at each end of the step while the rear end may be weighted as at $e^5$, or connected to a spring so as to keep the guard taut when in its closed position.

I preferably make the guard curved, as illustrated in Fig. 2, or inclined at such an angle, as illustrated in Fig. 9, that it will be impossible for any one to step upon the guard and retain a foothold thereon when the car is in motion.

In some instances it may be desirable to slightly raise the step so as to move it out of position and at the same time limit the movement of the guard, and this may be accomplished as in Figs. 12 and 13. Fig. 12 illustrates the tread of the step exposed and in position to be used, while Fig. 13 shows the tread $d'$ raised at an angle and the guard lowered to meet it. The guard $E^3$ in this instance is mounted on a shaft F', while the tread section $d'$ of the step is mounted on a shaft D' geared to the shaft F', so that when one of the shafts is turned the parts will be either separated or moved toward each other.

In Figs. 14 and 15, I have shown a modification in which the tread of the step is lowered slightly as the guard $E^4$ is moved to the closed position and when the guard is moved clear of the step the tread section $D^2$ is moved to a horizontal position, as in Fig. 14. In this construction it would be impossible for a person to retain a foothold on the step after the guard has commenced to close, so that there is no likelihood of a person having a foot caught between the tread and the guard.

Fig. 16, is a view illustrating a still further modification in which a fixed step tread $d$ is used and in place of a guard passing between the riser of the step and the platform the flexible guard $E^5$ is used, which travels under the tread and moves upward in the direction of the arrow to close the tread. This guard can be operated by an arm attached to a movable shaft and returned by a spring roller $h$ or its equivalent.

In Figs. 17, 18 and 19, I have illustrated a modification in which the guard $E^6$ is arranged to slide laterally to expose or close the tread $d$ of the fixed step D and this guard is preferably made in the form of a laminated structure; the plates of the structure being so connected that one plate will engage another. By this construction the several plates can be assembled in a very small space at one end of the step. I have shown a rack $n$ on the door meshing with a pinion $n'$ on a shaft N on which is a gear wheel $n^2$ meshing with a rack $n^3$ carrying the first section of the laminated structure, and the parts are so arranged in the present instance that the door will close half-way before the guard moves, giving time for a person to clear the step before the guard closes, and when the door is opened the guard will move during the first half of the movement of the door, thus the tread of the step will be cleared before the door is fully opened.

While I have shown the guard actuated through the medium of mechanism connected to the door, it will be understood that it may be operated independently of the doors, if desired, and other means of operating the guard may be resorted to without departing from the essential features of the invention.

It will be understood that the invention may be used in connection with any type of door desired, either a single swinging or sliding door, or a pair of swinging, or sliding doors. The doors may be swung over the platform or out from the platform as desired.

It will be understood that where the platform is both the ingress and the egress passageway, a single guard may be used to cover the steps in front of both passageways, or independent guards may be used coupled to independent doors for closing the individual steps.

It will be seen by the above that I wish to cover any construction of guard which will extend over the step and prevent its being used, and which can be moved so as to allow the step to be used.

While the invention is particularly adapted for use on street railway passenger cars where it is the common practice to provide only one step, it will be understood that it can be used on steam or inter-urban lines, where one or more steps are used and where the door or gate closing the passageway from the platform may be controlled independently of the means for protecting the step.

I claim:—

1. The combination of a platform having a doorway, a door arranged to close said doorway, a fixed step under the doorway, a movable guard for the step separate from the door, and means for moving said guard, said guard when in one position covering the step and when in the other position exposing both the tread and the riser, and being out of the path of the person mounting the step.

2. The combination of a platform, a step at one side of the platform, and a movable guard arranged to cover the tread of the step and adapted to move into a space under the platform.

3. The combination of a platform, a fixed step, a movable guard independent of the step, an operating shaft, and means connecting the operating shaft with the guard so that on turning the shaft the guard will be moved either over the tread of the step or clear of it.

4. The combination of a platform, a fixed step at one side of the platform, a curved guard pivotally mounted, and means for operating the guard so as to move it in position over the tread of the step or clear of the step and out of the path of the person mounting the step.

5. The combination of a platform, a step at the side of the platform, a door for closing the passageway leading from the platform, a guard arranged to cover the tread of the step, and means connecting the guard with the door so that on closing the door the guard will be moved to a position to close the step and on opening the door the guard will be moved clear of the tread of the step.

6. The combination in a platform of a fixed step at the side of the platform, a guard for the step, a shaft on which the guard is mounted, means for turning the shaft to move the guard so that it will assume a position over the tread of the step or a position between the riser of the step and the platform.

7. The combination of a fixed step, a guard for closing the step, means for operating the guard, and means to allow the guard to yield in case it meets an obstruction on the step when closed.

8. The combination of a fixed step, a pivoted guard, a shaft on which the guard is pivoted, an arm for moving the guard, and flexible means between the arm and the guard to allow the guard to yield in the event of it coming in contact with an obstruction on the step.

9. The combination in a platform, of a step at one side of the platform, a guard, and means for actuating both the tread of the step and the guard to prevent the use of the step.

In testimony whereof, I have signed my name to this specification, in the presence of two subscribing witnesses.

HENRY HOWSON.

Witnesses:
Wm. E. Shupe,
Wm. A. Barr.